(12) United States Patent
Chinnakonda (10) Patent No.: US 8,775,740 B2
(45) Date of Patent: Jul. 8, 2014

(54) SYSTEM AND METHOD FOR HIGH PERFORMANCE, POWER EFFICIENT STORE BUFFER FORWARDING

(75) Inventor: Muralidharan S. Chinnakonda, Austin, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1404 days.

(21) Appl. No.: 11/214,501

(22) Filed: Aug. 30, 2005

(65) Prior Publication Data
US 2006/0047912 A1 Mar. 2, 2006

Related U.S. Application Data (60) Provisional application No. 60/606,066, filed on Aug. 30, 2004.

(51) Int. Cl.
*G06F 12/08* (2006.01)

(52) U.S. Cl.
CPC .... *G06F 12/0864* (2013.01); *G06F 2212/6082* (2013.01); *G06F 2212/6032* (2013.01)
USPC ............................ 711/128; 711/204; 711/216

(58) Field of Classification Search
CPC ................... G06F 12/0864; G06F 2212/6082; G06F 2212/6032
USPC ......................... 711/128, 204, 216
See application file for complete search history.

(56) References Cited

U.S. PATENT DOCUMENTS

| | | | | |
|---|---|---|---|---|
| 4,048,623 A | * | 9/1977 | Gruner | 711/157 |
| 4,638,426 A | * | 1/1987 | Chang et al. | 711/216 |
| 5,899,994 A | * | 5/1999 | Mohamed et al. | 711/203 |
| 6,138,209 A | * | 10/2000 | Krolak et al. | 711/128 |
| 6,253,285 B1 | * | 6/2001 | Razdan et al. | 711/118 |
| 6,662,280 B1 | * | 12/2003 | Hughes | 711/156 |
| 2001/0052052 A1 | * | 12/2001 | Peng | 711/133 |
| 2007/0028051 A1 | * | 2/2007 | Williamson et al. | 711/128 |
| 2012/0066475 A1 | * | 3/2012 | Stravers et al. | 711/207 |

FOREIGN PATENT DOCUMENTS

EP 0486154 B1 * 7/1997 ............. G06F 12/10

OTHER PUBLICATIONS

"Cache Mapping and Associativity" on line at: http://www.laynetworks.com/Cache%20Mapping%20and%20Associativity.htm, © 2000-2004 Lay Networks, last visited Apr. 8, 2005, 2 pgs.
"Direct Mapped Cache," on line at: http://www.laynetworks.com/Direct%20Mapped%20Cache.htm#, © 2000-2004 Lay Networks, last visited Apr. 8, 2005, 4 pgs.
Moritz, Csaba A. et al., "Hot Pages: Software Caching for Raw Microprocessors," MIT-LCS Technical Memo LCS-TM-599, Aug. 1999, 12 pgs.

* cited by examiner

*Primary Examiner* — Sanjiv Shah
*Assistant Examiner* — Samuel Dillon
(74) *Attorney, Agent, or Firm* — Ronald O. Neerings; Wade James Brady; Frederick J. Telecky, Jr.

(57) ABSTRACT

The present disclosure describes a system and method for high performance, power efficient store buffer forwarding. Some illustrative embodiments may include a system, comprising: a processor coupled to an address bus; a cache memory that couples to the address bus and comprises cache data (the cache memory divided into a plurality of ways); and a store buffer that couples to the address bus, and comprises store buffer data, a store buffer way and a store buffer index. The processor selects the store buffer data for use by a data load operation if a selected way of the plurality of ways matches the store buffer way, and if at least part of the bus address matches the store buffer index.

19 Claims, 4 Drawing Sheets

SYSTEM AND METHOD FOR HIGH PERFORMANCE, POWER EFFICIENT STORE BUFFER FORWARDING

CROSS-REFERENCE TO RELATED APPLICATIONS

This application is a non-provisional application claiming priority to U.S. Provisional Application Ser. No. 60/606,066 filed on Aug. 30, 2004, entitled "Store buffer forwarding in a high performance processor," which is hereby incorporated by reference.

BACKGROUND

1. Technical Field

The present subject matter relates to store buffer forwarding in a pipelined computer processing system.

2. Background Information

A variety of techniques have been developed to improve the performance of microprocessor-based systems. Pipelining is one such technique that focuses on reducing latencies introduced when the processor has to wait for instructions to execute completely, one at a time. Pipelining allows processing of an instruction to be split into a series of smaller and faster execution stages. While one instruction is at one execution stage, another instruction is at another execution stage. The latency between instruction completions is thus reduced to the time duration of a single stage. But when a conditional branch instruction is encountered, a pipelined processor must predict the branch to follow and continue executing instructions along the predicted branch. If the prediction is wrong, the instructions wrongly executed must be aborted, an operation sometimes referred to as a pipeline "flush."

Any data stored in memory would be incorrect if it was saved by an instruction within a mispredicted branch. To avoid this, pipelined processors sometimes use one or more store buffers, which may hold data stored by instructions within the pipeline, together with the memory address of the data held. The data is not forwarded to the actual memory location until the processor validates the branch as an actual branch taken. If a flush occurs, the data in the target memory location remains uncorrupted.

When a pipelined processor incorporates a store buffer, loads that follow a store to a particular memory location may need to retrieve the data from the store buffer, rather than from memory, until the store buffer forwards its contents to memory. This means that when a load takes place, the processor may need to first check if the desired data is being held within the store buffer. This can be done by comparing the address of the desired data with the address of the data held in the store buffer.

But comparing the addresses can be time consuming, particularly in computer systems that utilize virtual memory addressing. In such systems the virtual address may need to be converted to a physical address before the comparison. The conversion can introduce delays that may prevent needed data from being available when required by the processor. Processor wait states, introduced to compensate for the delay, may adversely affect system performance. Speeding up the address conversion and comparison may result in undesirable system power consumption increases.

SUMMARY

The problems noted above are addressed in large part by a system and method for high performance, power efficient store buffer forwarding. Some illustrative embodiments may include a system, comprising: a processor coupled to an address bus; a cache memory that couples to the address bus and comprises cache data (the cache memory divided into a plurality of ways); and a store buffer that couples to the address bus, and comprises store buffer data, a store buffer way and a store buffer index. The processor selects the store buffer data for use by a data load operation if a selected way of the plurality of ways matches the store buffer way, and if at least part of the bus address matches the store buffer index.

Other illustrative embodiments may include a processor, comprising: an address bus; a processor core coupled to the address bus; a cache memory system that couples to the address bus, is divided into a plurality of sub-arrays, and comprises cache data; and a store buffer that couples to the address bus, and comprises store buffer data, a store buffer way and a store buffer index. The processor core uses the store buffer data in a data load operation if a value representing a selected sub-array of the plurality of sub-arrays matches the store buffer way, and if at least a portion of the bus address matches the store buffer index.

Yet further illustrative embodiments may include a method comprising: generating a current hash code by logically combining a plurality of address bits of a current cache address; identifying a selected way if the current hash code matches one of a plurality of stored hash codes; and selecting saved cache data held in a store buffer if the selected way matches a saved way held in the store buffer, and if at least part of the current cache address matches at least part of a saved cache address held in the store buffer.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following discussion and claims to refer to particular system components. This document does not intend to distinguish between components that differ in name but not function.

In the following discussion and in the claims, the terms "including" and "comprising" are used in an open-ended fashion, and thus should be interpreted to mean "including but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Additionally, the term "system" refers to a collection of two or more parts and may be used to refer to a memory cache, computer or communication system, or a portion of a memory cache, computer or communication system.

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims, unless otherwise specified. The discussion of any embodiment is meant only to be illustrative of that embodiment, and not intended to intimate that the scope of the disclosure, including the claims, is limited to that embodiment.

Figure 1:
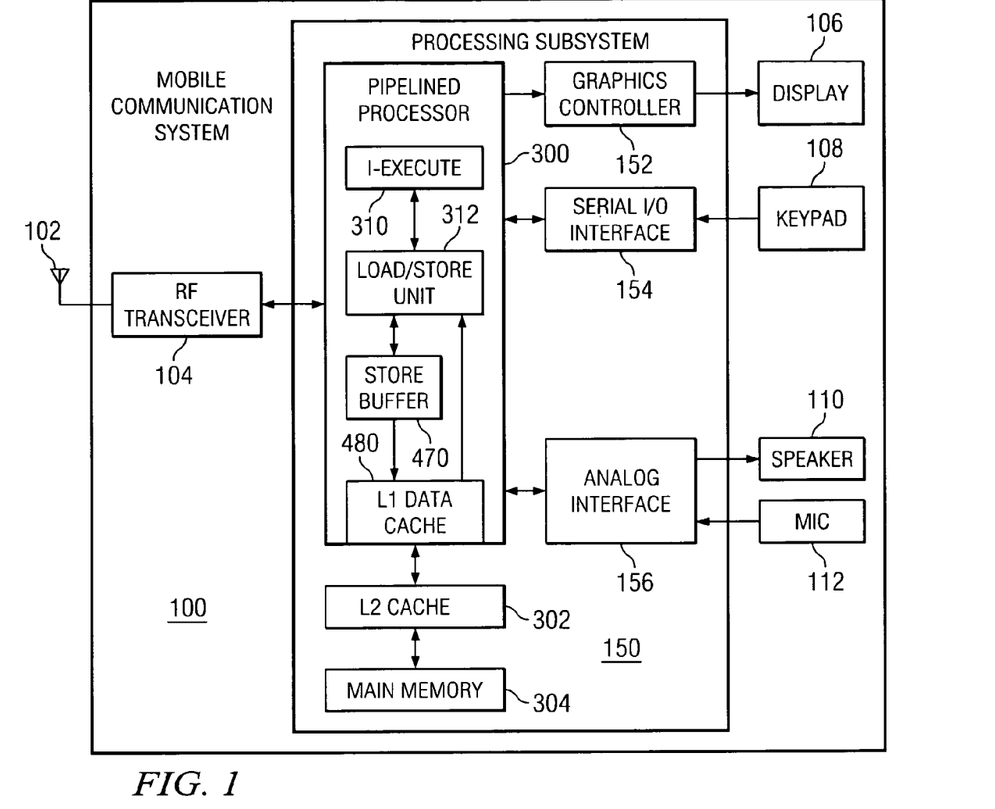
FIG. 1 illustrates a mobile communication system comprising a cache memory system and a store buffer constructed in accordance with at least some preferred embodiments.

FIG. 1 illustrates a pipelined processor with a cache memory system and a store buffer in the context of a mobile communication system (e.g., a cellular telephone), although this disclosure is not limited to communication systems and/or mobile systems. Mobile communication system 100 comprises a radio frequency (RF) antenna 102, an RF transceiver 104, a display 106, a keypad 108, a speaker 110, a microphone 112, and a processing subsystem 150. Processing subsystem 150 comprises processor 300, a level-2 (L2) cache 302, main memory 304, graphics controller 152, serial input/output (I/O) interface (I/F) 154 and analog I/F 156. Processor 300 comprises an instruction execute unit (I-Execute) 310, load/store unit 312, a store buffer 470, and a level-1 (L1) data cache 480, constructed in accordance with at least some preferred embodiments.

Figure 2:
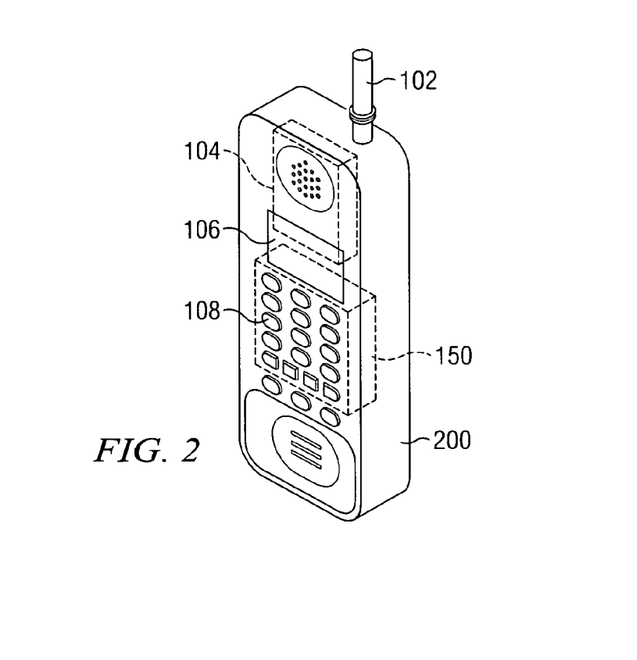
FIG. 2 illustrates a battery operated mobile communication device comprising a processing subsystem that includes a cache memory system and a store buffer constructed in accordance with at least some preferred embodiments.

Radio signals are received and transmitted through the antenna 102, which couples to RF transceiver 104. RF transceiver 104 couples to processor 300 and amplifies both received RF signals that are processed by processor 300, as well as transmitted signals generated by processor 300. Processor 300 may display information to a user via graphics controller 152 and display 106, and may accept commands and other information from a user via serial I/O I/F 154 and keypad 108. The processor 300 may provide audio information to the user (via analog I/F 156 and speaker 110), and may also accept audio for RF transmission (via microphone 112 and analog I/F 156). FIG. 2 illustrates how these components may be physically incorporated into a battery-operated, mobile communication device 200, such as a cellular telephone.

Referring again to FIG. 1, the processor 300 may interact with a multi-level, cache memory system, working in concert with a store buffer. In the preferred embodiment shown there are three levels of memory: main memory 304 (the slowest), the L2 cache 302 (faster and smaller than, and coupled to, main memory 304), and L1 data cache 480 (faster and smaller than both main memory 304 and L2 cache 302, and coupled to L2 cache 302). I-Execute 310 couples to load/store unit 312, which couples to both store buffer 470 and L1 data cache 480 and interacts with the cache memory system. When the I-Execute 310 of processor 300 executes an instruction that requires data from memory, the load store unit 312 reads the data from either the store buffer 470, from the L1 data cache if the required data is not stored in the store buffer 470, L2 data cache if the required data is not stored in either the store buffer 470 or the L1 data cache, or from main memory if the required data is not stored in the store buffer 470 or in either the L1 or L2 data caches. The load/store unit 312 then forwards the data read to the I-Execute 310. The source of the data is determined "on the fly" when the load/store unit initiates a data load.

As noted, the data read and used by the I-Execute 310 may originate from the store buffer 470. Data may be stored there, due to the pipelined nature of the processor of the preferred embodiments. When a data store intended for the L1 data cache is used by an instruction executing within the I-Execute 310 of the pipelined processor 300, the program branch being executed (comprising the data store) may not have been confirmed as an actual program branch taken. If the program branch were mispredicted, storing the data in the L1 data cache 480 would be an error. To avoid this situation, the pipelined processor 300 of FIG. 1 uses the store buffer 470 to hold the data stored until the branch can be identified as an actual program branch taken. If a program branch is identified as a mispredicted program branch, the pipeline is flushed of the erroneously executed instructions, and the original data in the L1 data cache 480 is preserved. If the program branch is confirmed as actually taken, the data in the store buffer 470 is valid and may be forwarded (committed) to the L1 data cache 480. Any instruction executed before the store data is committed, and that needs to perform a data load of the stored data, uses the data held in the store buffer 470. It should be noted that the point in time at which the store data is committed to the L1 data cache (or any other cache in the system) depends upon how the cache is configured to operate (e.g., as a write-through or a write-back cache). Many cache memory configurations are possible, and all such configurations are intended to be within the scope the present disclosure.

Figure 3:
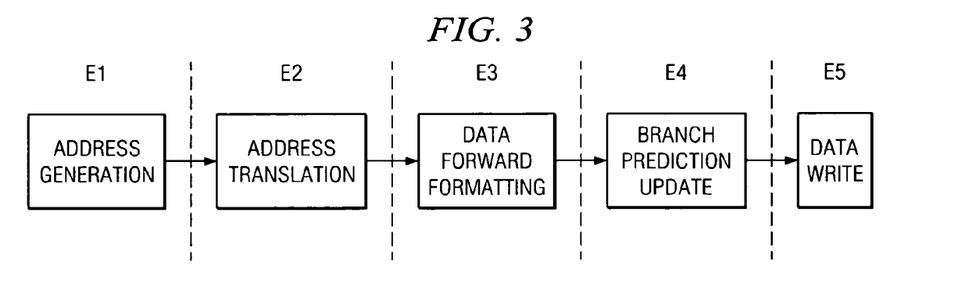
FIG. 3 illustrates the timing of the execution stages of a pipelined processor in accordance with at least some preferred embodiments.

FIG. 3 illustrates the timing of the execution stages of the I-Execute 310, in accordance with at least some preferred embodiments. The five stages shown are stages within the overall pipeline of the processor 300 of FIG. 1. Execution stage 1 (E1) is the stage where the virtual address of the data needed by the executing instruction is generated. The virtual address is then translated to a physical address in memory during execution stage 2 (E2). When the instruction reaches execution stage 3 (E3), data that needs to be stored by the executing instruction is stored and held in the store buffer 470 of FIG. 1. This is done because the determination of the validity of the branch comprising the instruction may not occur until the current instruction reaches execution stage 4 (E4). If the next instruction executing in the pipeline needs to load the data just stored, it accesses the data in the store buffer 470. This allows time for the branch to be validated in stage E4, and for the data to be forwarded and committed to the L1 data cache 480 in execution stage 5 (E5) if the branch is found to be valid. Any load subsequent to the validation may then access the data in the L1 data cache 480.

Figure 4:
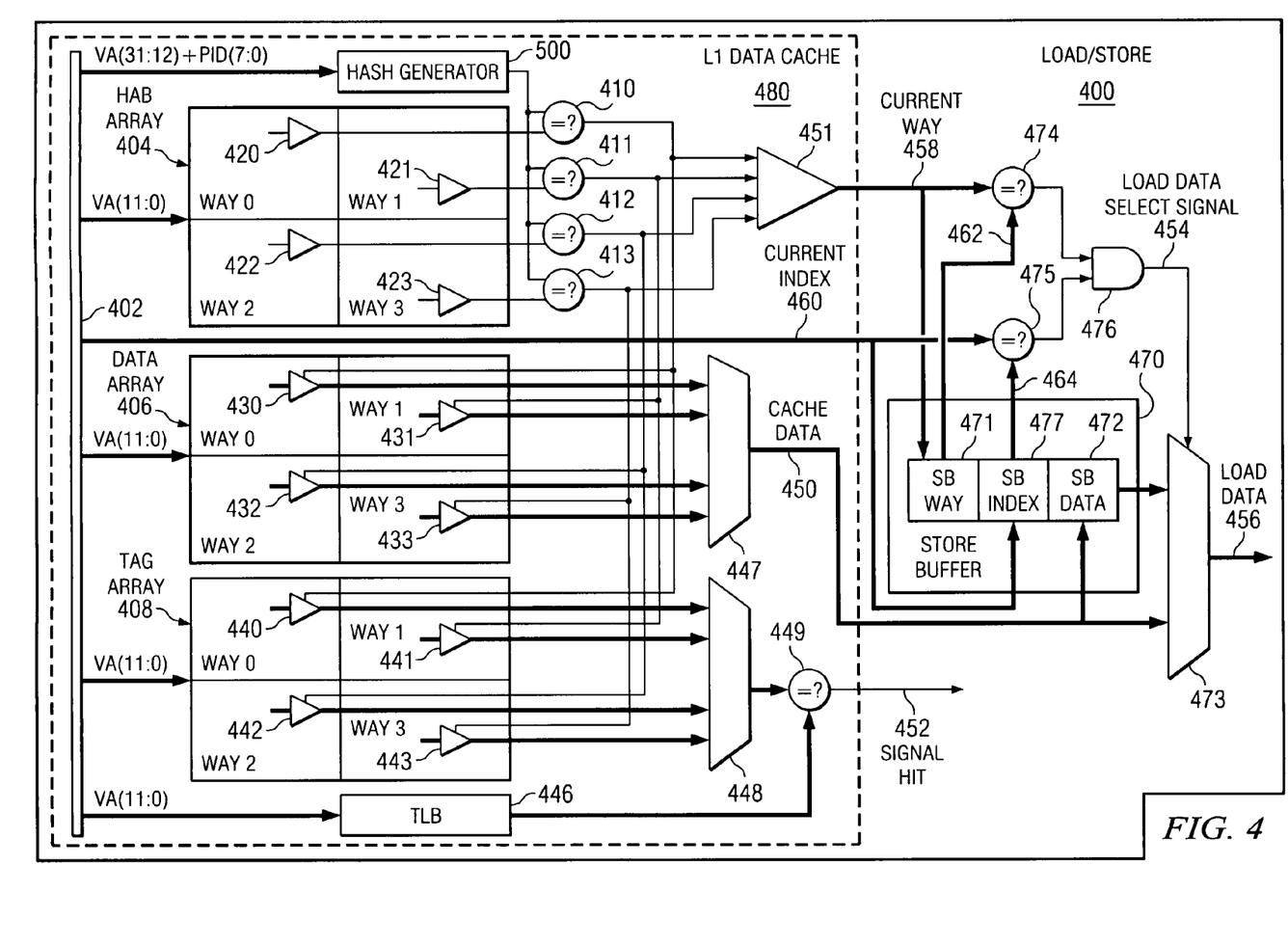
FIG. 4 illustrates a cache memory system and a store buffer constructed in accordance with at least some preferred embodiments.

FIG. 4 illustrates a load/store 400 constructed in accordance with at least some preferred embodiments. The load/store 400 comprises store buffer 470 (which holds store buffer (SB) address 471, SB data 472, and SB index (Idx) 477), way hit buffer 451, store buffer 470, load data multiplexer 473, way hit comparator 474, address comparator 475, select AND gate 476, and L1 data cache 480. The L1 data cache 480 comprises address bus 402, which couples to Hash Address Buffer (HAB Array) 404, data memory (Data Array) 406, tag memory (Tag Array) 408, translation look-aside buffer (TLB) 446, and hash generator 500. Data Array 406 may comprise a memory array that may store the cached data. Tag Array 408 may also comprise a memory array, which may be used to store information that describes the origin and status of the data stored in Data Array 406. Each entry in Tag Array 408 may correspond to an entry or group of entries in Data Array 406. The information in Tag Array 408 may include an address corresponding to the location in main memory 304 (FIG. 1) from where the cached data stored in Data Array 406 originated and is ultimately stored.

Figure 5:
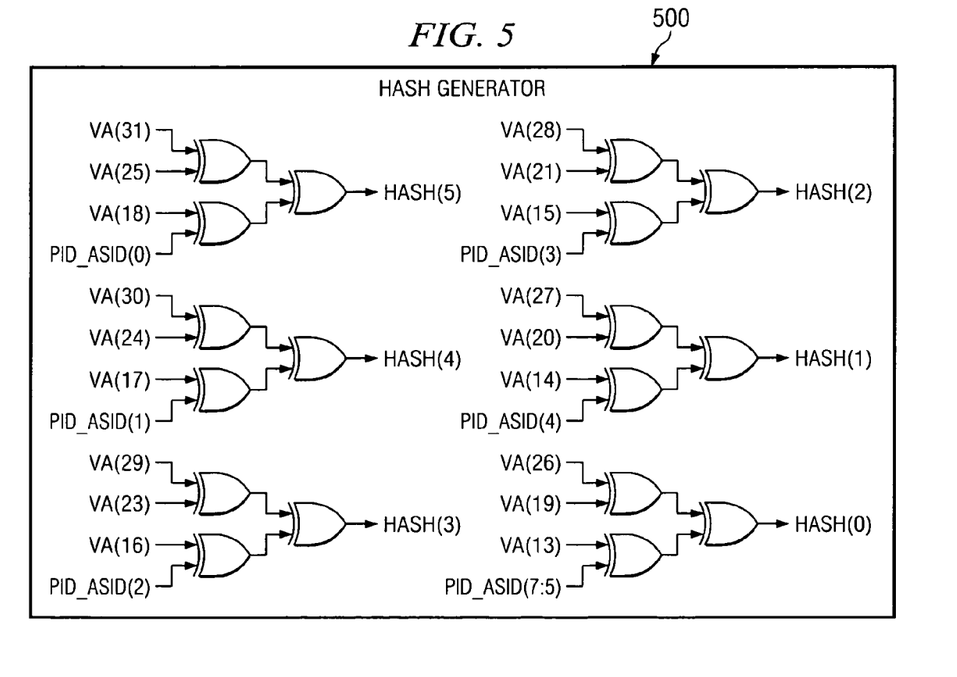
FIG. 5 illustrates a hash code generator configured to operate within a cache memory system constructed in accordance with at least some preferred embodiments.

Continuing to refer to FIG. 4, the HAB Array 404 may comprise a memory array that stores "hashed" address entries, wherein each hashed address entry corresponds to an entry in both Data Array 406 and Tag Array 408. Hashing refers to a process that converts a source numerical value from a large domain into a hashed numerical value constrained to a smaller range. A single hashed value may thus result from any number of different source values. In the preferred embodiments described, a one-to-many relationship may exist between a hashed address stored in the HAB Array 404 and a set of source addresses that may be stored in Tag Array 408. The set of source addresses may be represented by the hashed address. A portion of the address present on the address bus 402 may be used to generate a hashed address comprising significantly fewer bits than the number of bits used to generate the hashed address. This may be done by selectively combining address bits through a series of logical "exclusive or" (XOR) combinations. FIG. 5 illustrates an exemplary combination of bits, wherein 18 of the 20 most significant bits of a 32-bit virtual address (VA) and 8 process ID/application source ID (PID_ASID) bits are "hashed" together to generate a 6-bit hash code. The choice of hash function will vary, and may depend on such factors as overall processor architecture, process sizes, and address mappings. The hash function illustrated in FIG. 5 is just one of numerous functions that may be used, and the preferred embodiments are not intended to be limited to any one particular function or embodiment.

The exemplary hash function of FIG. 5 may be implemented by combining groups of bits using two levels of XOR gates, wherein each group combines to produce one bit of the hash code. Thus, for example, VA(31) and VA(25) are XOR'd together, as are VA(18) and PID_ASID(0), and the results of the two XOR operations are in turn combined by another XOR gate, producing Hash(5). Similar operations are performed on other VA and PID_ASID bits. The resulting 6-bit hash code acts as a fingerprint that identifies an address as belonging to a group of addresses that share a common fingerprint. Thus, if two hash codes do not match, the addresses that generated the two hash codes are known not to match. But if two hash codes do match, the two addresses that produced the same hash code may match, but are not known with certainty to match. Within the context of the L1 data cache 480, a hash code match thus represents a possible cache hit, since it is possible, but not known to a certainty, that the two addresses that produced the same hash code may match.

Referring again to FIG. 4, when data is initially written to the L1 data cache 400, the data is stored within Data Array 406, the main memory address of the origin of the data is stored within Tag Array 408, and the 6-bit hash code representing a portion of the address present on address bus 402 is stored in HAB Array 404. Later, when the processor 300 of FIG. 1 accesses the stored data, the corresponding hashed address stored in HAB Array 404 is read and compared to the hashed portion of the address currently present on address bus 402. Hash generator 500, which implements the same exclusive OR function previously described and illustrated in FIG. 5, performs the hashing of the address on the bus. If the stored hashed address matches the hashed address from hash generator 500, the data needed by the processor 300 may be stored in Data Array 406 of the L1 data cache 480. However, if the stored hashed address does not match the generated address, then the needed information is not in the L1 data cache 480, and the L2 cache must now be accessed.

The comparison between the stored hashed address and the hashed address from hash generator 500 is performed by address comparators 410 through 413. The hash generator 500 and HAB Array 404 both couple to the comparators, but the HAB Array 404 has four individual output paths that each couple to a comparator, whereas hash generator 500 has a single output path that couples to all four of the comparators. The four output paths from the HAB Array 404 each originate from one of four sub-arrays referred to as "Ways". Each Way comprises a distinct region or sub-array within the memory array of HAB Array 404. Ways may be selectively read to conserve power, or read concurrently to access multiple data paths in parallel and improve performance. Both the Data Array 406 and the Tag Array 408 also comprise Ways and have the same number of Ways in their memory arrays as the HAB Array 404 (four Ways in the preferred embodiment illustrated in FIG. 4, implementing a 4-way, set-associative cache memory).

When an address is presented on the address bus 402, memory locations corresponding to the address are made accessible in all of the Ways of the HAB Array 404, Data Array 406, and Tag Array 408, though initially only the HAB array 404 is actually accessed. Actual access of a Way may be accomplished by enabling sense amplifiers corresponding to that Way within a given memory array (HAB, Data, or Tag). The HAB Array 404 comprises four sets of hash sense amplifiers 420 through 423, each set corresponding to a Way. Similarly, Data Array 406 comprises data sense amplifiers 430 through 433, and Tag Array 408 comprises tag sense amplifiers 440 through 443.

The hash sense amplifiers 420 through 423 of the HAB Array 404 are always enabled, which results in data being read from all Ways of the HAB Array 404 memory array whenever an address is presented to the array. This permits hashed addresses from all of the Ways of the HAB Array 404 to be concurrently presented to the comparators 410 through 413. Although all of the Ways of the HAB are accessed together, using a relatively small number of bits for the hash code, as compared to the total number of bits for the data and tag information, reduces the power consumption incurred by accessing the HAB.

Each hashed address is contemporaneously compared with the hashed address originating from hash generator 500. If any of the stored hashed addresses match the hashed address from the hash generator 500, then a possible cache hit has been detected and Data Array 406 may contain the information required by the processor 300. Each of the comparators 410 through 413 couples to the sense amplifiers for a Way of both Data Array 406 and Tag Array 408, and each corresponds to the Way of the HAB Array 404 coupled to a particular comparator. Thus, for example, Way 0 of the HAB Array 404 couples to comparator 410, which in turn couples to sense amplifiers 430 (corresponding to Way 0 of Data Array 406) and to sense amplifiers 440 (corresponding to Way 0 of Tag Array 408).

The output signal generated by each comparator drives an enable control node on each of the sense amplifiers. If any one of the comparators 410 through 413 detects that there is a hashed address match for a given Way, the output signal from the comparator will enable the sense amplifiers for the corresponding Way in both Data Array 406 and Tag Array 408, resulting in a read of data stored in Data Array 406 and Tag Array 408. In this manner only the Way potentially comprising the desired data is read. By only enabling and reading data through sense amplifiers that are coupled to smaller sub-arrays, rather than coupled to the full memory array, the sense amplifiers of the preferred embodiments consume less power than would sense amplifiers coupled to all associative ways of the memory arrays.

Each of the data sense amplifiers 430-433 in Data Array 406 couple to cache data multiplexer 447. The output signal from cache data multiplexer 447 is the cache data 450, originating from the selected Way and presented to the load data multiplexer 473 and the store buffer 470. Each of the tag sense amplifiers 440443 couple to cache tag multiplexer 448, which in turn couples to physical address comparator 449 and provides the comparator with a stored physical address from Tag Array 408. TLB 446 also couples to physical address comparator 449, providing a physical address that is compared with the stored physical address from Tag Array 408. The physical address provided by TLB 446 is mapped from a virtual address present on address bus 402. The mapping is performed in parallel to the accesses to the Ways of the HAB, Data, and Tag arrays such that an accessed physical address from the Tag Array 408 and a physical address provided by the TLB 446 may be contemporaneously presented to the physical address comparator 449 when a possible hit is detected. Physical address comparator 449 asserts hit signal 452 if the stored physical address from TAG Array 408 matches the physical address provided by TLB 446. If a hit is indicated, the data stored in Data Array 406 is the desired cache data.

It should be noted that although the TLB 446 is accessed in parallel with the accesses to the other arrays, the address read from the TLB 446 is not required until after the other arrays have been accessed, the possible hit detection has been made, and a physical address has been read from the Tag Array 408. Because the TLB 446 is not part of a critical speed path, it may be designed to operate at a slower speed than the other arrays. By operating the TLB 446 at a slower speed, additional power savings may be achieved.

The output of comparators 410-413, each of which may indicate a possible cache hit, may also be used to help determine if the store buffer 470 is holding the desired cache data. As shown in FIG. 4, the output nodes of comparators 410-413 couple to the input nodes of Way hit buffer 451, the output of which in turn couples to the input node of Way hit comparator 474 and store buffer 470. The output node of way hit comparator 474 couples to one of the input nodes of select AND gate 476. Further, address bus 402 and store buffer 470 both couple to input nodes of the address comparator 475, and the output node of the address comparator 475 couples to the other input node of select AND gate 476. Select AND gate 476 thus produces the load data select signal 454, which is asserted if the Way hit indicated by the address comparators 410-413 (represented by current Way 458) matches the SB Way 471 stored within store buffer 470, and if the SB index 477 stored within store buffer 470 matches at least part of the address present on address bus 402 (current index 460). In the preferred embodiment illustrated, current Way 458 represents a digital value indicative of the results of the address comparators 410-413 (i.e., the selected way). The SB index 477 comprises only a portion of a virtual address previously presented on address bus 402. The bits of the virtual address held in the store buffer correspond to current index 460, which also correspond to the same bits used to address the Hash, Data, and Tag arrays (virtual address bits 11 through 0 in the example shown).

The output node of select AND gate 476 couples to the selection node of load data multiplexer 473, which permits the load data select signal 454 to control which input signal is selected and presented at the output node of the load data multiplexer 473. The two input nodes of the load data multiplexer 473 couple to the output node of the store buffer 470 and the output node of the cache data multiplexer 447 respectively, allowing the load data multiplexer to select between the cache data 450 and the SB data 472 as data sources. Address comparator 475 compares SB index 477 against current index 460. Also, as already described, Way hit comparator 474 compares SB way 471 against current way 458. If the indices match, and the Ways match, then the SB Data 472 is the desired data. Select AND gate 476 signals this condition by asserting the load data select signal 454. If the load data select signal 454 indicates that the store buffer 470 holds the desired data, the load data multiplexer 473 selects the SB Data 472. Absent such an indication, the load data multiplexer 473 may instead select the data originating from the way of Data Array 406 selected by cache data multiplexer 447 (Cache Data 450). Instructions executed by the pipelined processor 300 of FIG. 1 may then use the data selected by load data multiplexer 473 (load data 456).

It should be noted that although the preferred embodiment of FIG. 4 performs a selection between all bits of either the store buffer data 472 or the cache data 450, load data multiplexer 473 can also be configured to only select a subset of bits (e.g., a single byte) of the store buffer 470. Thus, for example, if the data word width is 32 bits, but only a single, 8-bit byte is held in the store buffer, the load data multiplexer 473 would select 8 bits from the store buffer and the remaining 24 bits from the data array 406 if the store buffer held the required data. Other combinations of bit widths are possible, and all such variations are intended to be within the scope of this disclosure.

By using only some of the virtual address bits for the comparison preformed by address comparator 475, the size of both the comparator and store buffer 470 are reduced as compared to the size that would be required if all of the virtual address bits were used. Also, by using address bits from the address bus 402, the comparison preformed by address comparator 475 may be performed at an earlier execution pipeline stage than might be necessary if, for example, a translated physical address from TLB 446 were used as a reference instead. Referring to FIG. 3, the address comparison can take place as early as execution stage E1, and the data selection may be preformed by load data multiplexer 473 as early as execution stage E2. This would make the desired data available as early execution stage E3. Because the address comparison and data selection occur in the earlier pipeline execution stages, none of the associated logic (i.e., multiplexer 473, comparator 474, comparator 475, and AND gate 476) is within the critical speed path of the load/store 400 of the preferred embodiment of FIG. 4. This logic may thus be optimized for lower power consumption rather than higher speed. Because these operations are performed in parallel with the cache memory hit/miss detection, no additional delays are introduced by any of the associated logic.

Figure 6:
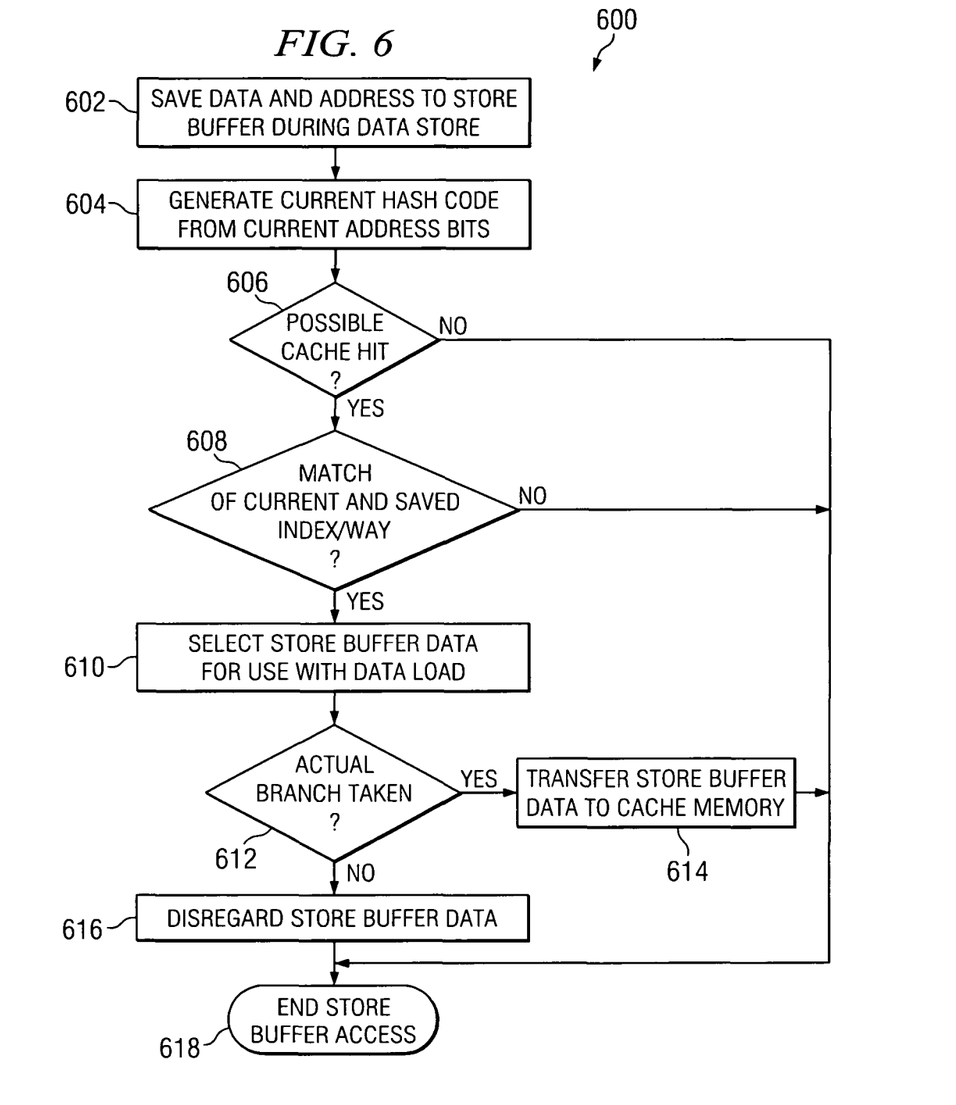
FIG. 6 illustrates a method for accessing data within a store buffer in accordance with at least some preferred embodiments.

FIG. 6 illustrates a method 600 for accessing a store buffer used by a pipelined processor, in accordance with at least some preferred embodiments. When a data store operation is performed, the data being stored and the cache destination address of the data are both saved in the store buffer (block 602). The address saved may be a partial address, based on a subset of address bits, which maps a cache memory within a larger address space. A subsequent data load operation then begins with the generation of a current hash code based on a subset of current address bits (block 604). If the current hash code does not match any saved hash codes corresponding to the cache memory location currently addressed, a possible cache hit has not been detected (block 606). This indicates that the data needed is not stored in either the cache memory or the store buffer, and the store buffer access is ended (block 618).

If a possible cache hit is detected in block 606, the subset of address bits used to access the cache memory is compared with the partial address saved in the store buffer (block 608). If the partial addresses do not match, the store buffer does not contain the needed data and the store buffer access is ended (block 618). If the partial addresses do match in block 608, the store buffer does contain the needed data and is selected as the source of the data used by the data load operation (block 610). After the data is made available to the load instruction, subsequent execution stages may decide if the program branch currently being executed is an actual branch taken, rather than a predicted branch (block 612). If the current program branch is classified as an actual branch taken, the data saved in the store buffer is transferred (committed) to the cache memory location at the address also saved in the store buffer (block 614), and the store buffer access is ended (block 618). If the current program branch is not an actual branch taken (i.e., it is a mispredicted branch), the data saved in the store buffer is invalid and is disregarded by subsequent load operations (block 616). Once the branch is identified as a mispredicted branch, the store buffer access is ended (block 618).

The above disclosure is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
a processor coupled to an address bus;
   a cache memory that couples to the address bus and comprises cache data, the cache memory divided into a plurality of ways; and
   a store buffer that couples to the address bus, and comprises store buffer data, a store buffer way and a store buffer index,
wherein,
   the processor selects the store buffer data for use by a data load operation if both (i) a selected way of the plurality of ways matches the store buffer way and (ii) at least part of a virtual address on the address bus matches the store buffer index; otherwise, when the selected way matches the store buffer way, the processor selects the cache data corresponding to the selected way, and
   when the selected way does not match the store buffer way, the processor ends a store buffer access;
   a hashed address generator that couples to the address bus and converts the virtual address present on the address bus into a current hashed address; and
   a hash memory that couples to the address bus and comprises a saved hashed address associated with the cache data;
wherein the current hashed address is compared to the saved hashed address; and
wherein the result of the comparison of the hashed addresses is the selected way.

2. The system of claim 1, wherein the store buffer data, the store buffer way and the store buffer index are saved into the store buffer by the processor during a data store operation.

3. The system of claim 1, wherein the store buffer data is valid if a branch of a program executed by the processor is identified as an actual program branch taken.

4. The system of claim 1, wherein the store buffer data is not valid if a branch of a program executed by the processor is identified as a mispredicted program branch.

5. The system of claim 1, wherein the processor deselects the store buffer data if a branch of a program executed by the processor is identified as a mispredicted program branch.

6. The system of claim 1,
wherein the hash memory is organized as a plurality of hash ways;
   wherein the plurality of hash ways are enabled when the current hashed address is compared against the saved hashed address; and
   wherein a hash way of the plurality of hash ways comprises the saved hashed address.

7. The system of claim 1, wherein the system is a mobile communication system.

8. The system of claim 1, wherein, when an address is presented on the address bus, an output of each saved hashed address in the hash memory is contemporaneously compared at respective comparators with the current hashed address output from the hashed address generator;
   an output of each of the respective comparators being coupled to a respective sense amplifier at a corresponding one of the plurality of ways to only enable the corresponding one of the plurality of ways in the cache memory through the respective sense amplifiers.

9. A processor, comprising:
an address bus;
   a processor core coupled to the address bus;
   a cache memory system that couples to the address bus, is divided into a plurality of sub-arrays, and comprises cache data; and
   a store buffer that couples to the address bus, and comprises store buffer data, a store buffer way and a store buffer index;
wherein
   the processor core uses the store buffer data in a data load operation if both (i) a value representing a selected sub-array of the plurality of sub-arrays matches the store buffer way, and (ii) at least a portion of a virtual address on the address bus matches the store buffer index; otherwise, when the selected sub-array matches the store buffer way, the processor uses the cache data corresponding to the selected sub-array,
   when the selected sub-array does not match the store buffer way, the processor core ends a store buffer access;
   a hashed address generator that couples to the address bus and converts the virtual address present on the address bus into a current hashed address; and
   a hash memory that couples to the address bus and comprises a saved hashed address associated with the cache data;
wherein the current hashed address is compared to the saved hashed address; and
wherein the result of the comparison of the hashed addresses is the selected way.

10. The processor of claim 9, wherein the processor core performs a data store operation that saves the store buffer data, the store buffer way and the store buffer index to the store buffer.

11. The processor of claim 9, wherein the store buffer data is marked as valid if a branch of a program executed by the processor core is identified as an actual program branch taken.

12. The processor of claim 9, wherein the store buffer data is marked not valid and is not used by the data load operation if a branch of a program executed by the processor core is identified as a mispredicted program branch.

13. The processor of claim 9,
wherein the hash memory is organized as a plurality of hash arrays;
wherein the plurality of hash arrays are enabled when the current hash code is compared against the saved hash code; and
wherein a hash array of the plurality of hash arrays comprises the saved hash code.

14. The system of claim 9, wherein, when an address is presented on the address bus, an output of each saved hashed address in the hash memory is contemporaneously compared at respective comparators with the current hashed address output from the hashed address generator;
- an output of each of the respective comparators being coupled to a respective sense amplifier at a corresponding one of the plurality of sub-arrays to only enable the corresponding one of the plurality of sub-arrays in the cache memory through the respective sense amplifiers.

15. A method, comprising:
- generating a current hash code by logically combining a plurality of address bits of a current address, wherein the current address is a virtual address;
- comparing the current hash code with a plurality of stored hash codes;
- identifying a selected way if the current hash code matches one of a plurality of stored hash codes, the selected way being the result of the comparison;
- when the selected way is identified, mapping the virtual address to a physical address;
- when the selected way is not identified, ending a store buffer access; and
- when the selected way is identified, selecting saved cache data held in the store buffer if both (i) the selected way matches a saved way held in the store buffer, and (ii) at least part of the physical address mapped from the virtual address matches a saved cache address held in the store buffer, otherwise selecting cache data in a way of a cache memory corresponding to the selected way.

16. The method of claim 15, further comprising storing the saved cache address, the saved way and the saved cache data to the store buffer.

17. The method of claim 15, further comprising identifying the cache data in the store buffer as valid after classifying a branch of an executing program as an actual program branch.

18. The method of claim 15, further comprising ending the selecting of the saved cache data after classifying a branch of an executing program as a mispredicted program branch.

19. The method of claim 15, further comprising identifying the cache data in the store buffer as invalid after classifying a branch of an executing program as a mispredicted program branch.

* * * * *